United States Patent [19]

Sidell

[11] 3,786,291

[45] Jan. 15, 1974

[54] SYNCHRONOUS MOTOR

[75] Inventor: Philip A. Sidell, West Hartford, Conn.

[73] Assignee: McGraw-Edison Company, Elgin, Ill.

[22] Filed: Oct. 2, 1972

[21] Appl. No.: 293,950

Related U.S. Application Data

[63] Continuation of Ser. No. 89,347, Nov. 30, 1970, abandoned.

[52] U.S. Cl. .............................. 310/162, 310/154
[51] Int. Cl. ............................................. H02k 21/00
[58] Field of Search ............... 310/162–164, 154, 156, 49, 181, 268

[56] References Cited
UNITED STATES PATENTS

| | | | |
|---|---|---|---|
| 3,356,876 | 12/1967 | Scholten | 310/162 |
| 1,946,289 | 2/1934 | Lilienthal | 310/163 |
| 2,691,126 | 10/1954 | Jeffers | 310/163 |
| 2,993,159 | 7/1961 | Devol | 310/268 |
| 3,252,053 | 5/1966 | Paddison | 310/268 |
| 3,475,630 | 10/1969 | Heinzen | 310/156 |
| 3,483,411 | 12/1969 | Amako | 310/162 |

Primary Examiner—R. Skudy
Attorney—Prutzman et al.

[57] ABSTRACT

A synchronous motor having a plurality of ferromagnetic pole extensions cooperating with a permanent magnet of the oriented type that is through-magnetized. A principal form of the invention places the pole extensions on one side of the permanent magnet rotor.

8 Claims, 18 Drawing Figures

PATENTED JAN 15 1974
3,786,291
SHEET 1 OF 4
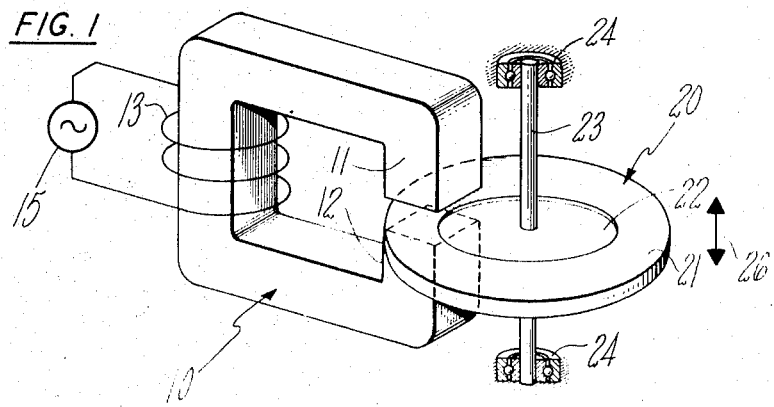
FIG. 1
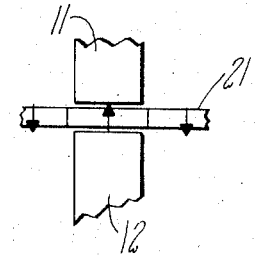
FIG. 2
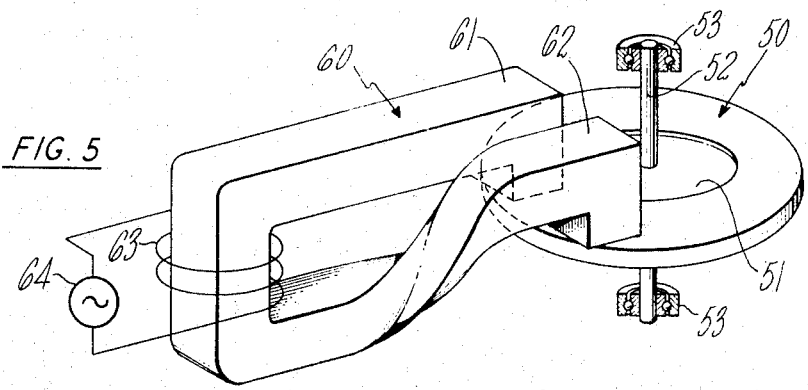
FIG. 5
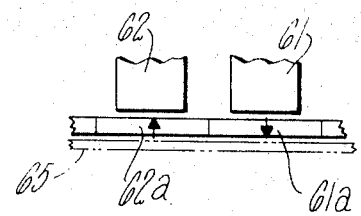
FIG. 6
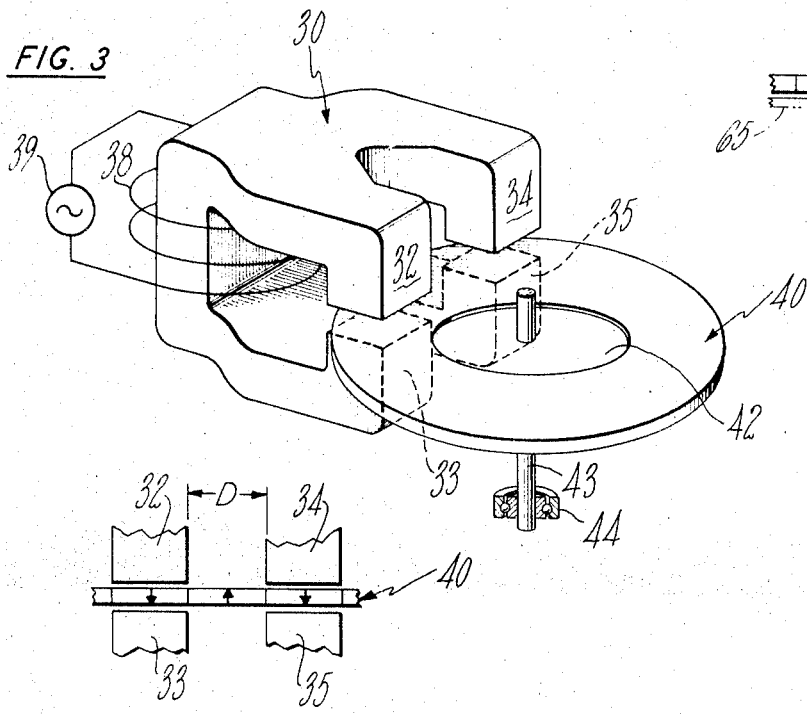
FIG. 3
FIG. 4
INVENTOR
PHILIP A SIDELL
BY Pratzman, Hayes, Kalb and Chilton
ATTORNEYS PATENTED JAN 15 1974 3,786,291
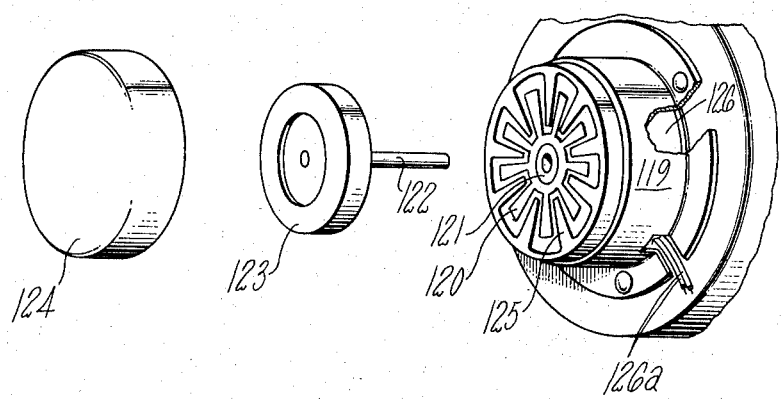
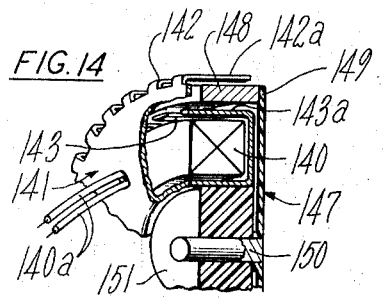
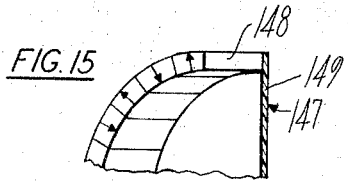
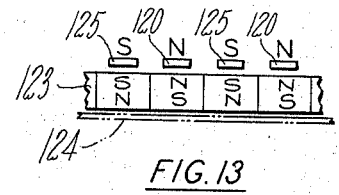
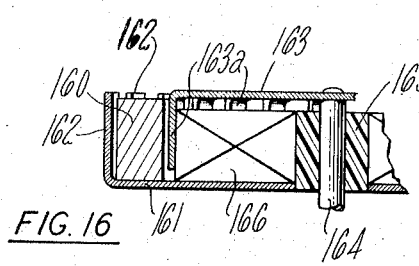
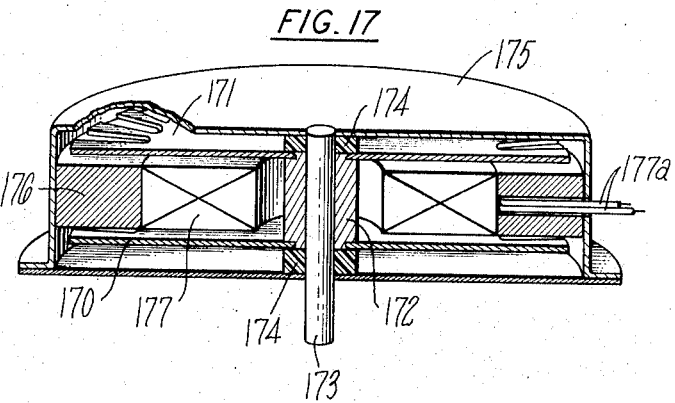
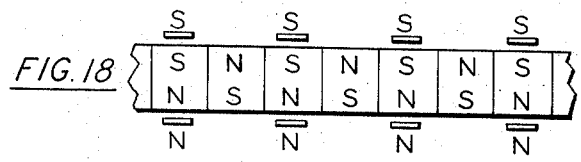

SYNCHRONOUS MOTOR

This application is a continuation of applicant's prior co-pending patent application Ser. No. 89,347 filed Nov. 13, 1970 now abandoned.

The present invention relates generally to synchronous motors and is more particularly related to synchronous motors of the type utilizing a permanent magnet, often as the rotating part of the motor.

Motors of the type to which the present invention relates, generally and customarily use a permanent magnet rotor which cooperates with an alternating current field coil, which field coil is disposed about the rotor with flux conducting field poles interleaved about the outer periphery of the permanent magnet rotor. The outer periphery or circumferential surface of the permanent magnet is provided with alternating north and south poles which react with the field poles as the field poles change in their magnetic polarity in synchronism with the alternating current frequency thereby to produce rotor motion.

In departing from and improving upon the characteristics of such a synchronous motor, it is a principal object of this invention to provide a permanent magnet synchronous motor having improved rotor torque output, while at the same time providing improved electrical efficiency for the motor.

It is a further principal object of this invention to provide an improved permanent magnet synchronous motor of the axial air-gap type having improved output torque and high electrical efficiency.

An additional object of this invention is the provision of an improved permanent magnet synchronous motor utilizing permanent magnets of the oriented type so as to produce a synchronous motor of improved rotor torque output, improved efficiency and susceptible of construction in a variety of motor configurations.

It is a still further object of this invention to provide an improved permanent magnet synchronous motor which is of low-cost construction, easily manufactured to provide long life with a minimum of bearing wear, need for adjustment, etc.

A better understanding of the invention will be obtained from the following detailed description and the accompanying drawings of illustrative applications of the invention.

In the drawings:

FIG. 1 is an isometric view showing in schematic arrangement a synchronous motor having a permanent magnet rotor arranged in accordance with the present invention;

FIG. 2 is a schematic partial end view of the motor of FIG. 1 showing the relative magnetic orientation of the field poles and rotor poles;

FIG. 3 is an isometric schematic view of the motor of FIG. 1 utilizing parallel flux conductors in the stator circuit;

FIG. 4 is a schematic end view showing the relative magnetic pole orientation of the motor of FIG. 3;

FIG. 5 is a schematic view of a motor of this invention utilizing a modified field pole arrangement;

FIG. 6 is an end view of the motor configuration of FIG. 5 showing the magnetic pole configuration and showing an optional magnetic return circuit;

FIG. 12 is an exploded isometric view of an alternative embodiment of the motor of FIG. 9;

FIG. 13 is a diagram similar to that of FIG. 10 showing the pole arrangement in schematic form for the motor of FIG. 12;

FIG. 14 is a partial isometric view of a motor having a radially through-magnetized rotor;

FIG. 15 is a schematic view of the rotor of the motor of FIG. 14;

FIG. 16 is a partial cross-section view of a modified form of the motor of FIG. 14;

FIG. 17 is a view partially in cross-section of another embodiment of the invention wherein a low-mass rotor is provided;

FIG. 18 is a schematic view of the instantaneous polarities of the flux conductors in cooperation with the permanent magnet.

Figure 7:
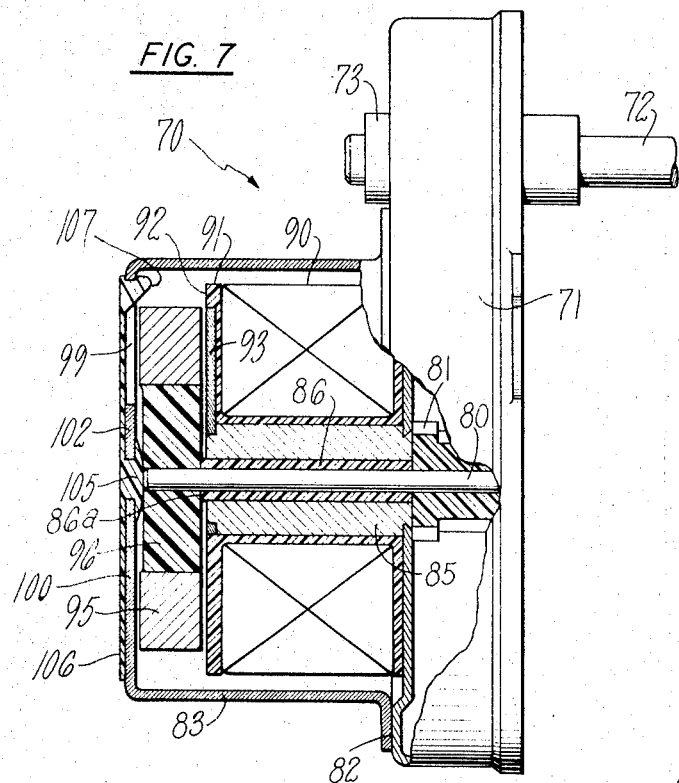
FIG. 7 is a side elevation view partially in cross-section showing the commercial form of an axial air-gap motor of the present invention.
Figure 8:
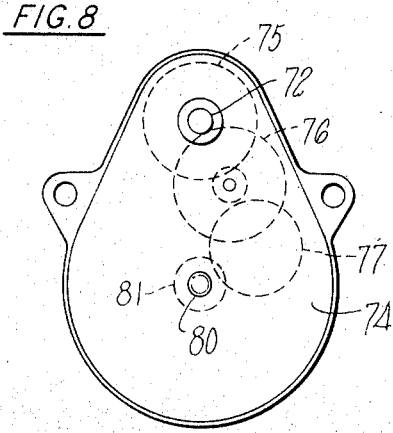
FIG. 8 is an elevation view of the front or the gear case portion of the motor of FIG. 7.

Before turning to a detailed consideration of the various embodiments of this invention as set forth in the drawings, it is believed helpful to consider the state of the art in permanent magnets of the ceramic type. Such magnets have long been available and have, with improvements in the art, become considerably stronger in available magnetic force and have been utilized to produce improved synchronous motors of the permanent magnet type. In recent years, however, there has developed what is generically termed 'oriented permanent magnets' which are dramatically stronger in available MMF than those of the non-oriented prior art. While the construction of such magnets forms no part of the present invention, nonetheless utilization of such oriented magnet contributes to some of the improved features of the present invention and it is therefore worthwhile to consider briefly their construction. During the formation of the ceramic mix and its firing during the manufacturing operation, oriented magnets are subjected to a magnetic field which is believed to orient the ferromagnetic particles of the ceramic mix so that, upon completion of the manufacturing operation, magnets are available which can be subjected to a magnetizing field to thereafter retain a much higher available MMF than heretofore available with non-oriented magnets. However, such magnets have been heretofore unsuitable for utilization in permanent magnet synchronous motors because of the difficulty in producing orientation of the particle in the desired curved path configuration of conventional permanent magnet field structures. The permanent magnets of the present invention are ideally suited to the utilization of the vastly improved MMF available from oriented magnets.

Turning first to FIGS. 1 and 2 for a general understanding of a basic concept of this invention, there is disclosed a motor having a ferromagnetic field structure 10 of generally C-shaped cross-section to provide a first electromagnetic pole 11 and a second electromagnetic pole 12. An AC field coil 13 embraces one leg of the field structure for energization from a suitable alternating current source 15 thereby to provide a two-pole stator structure wherein the magnetic poles 11, 12 alternate in magnetic polarity in accordance with the frequency of the AC source 15. The rotor 20 is principally characterized by the provision of a generally annular permanent magnet 21 supported on a suitable hub 22 with a rotor shaft 23 supported in appropriate bearing 24 for rotation in a position to bring the permanent magnet annulus between the poles 11, 12. If desired the rotor can be a solid disc but because the central or hub portion of the rotor does not cooperate with the AC poles 11 and 12, it has been found advantageous to form the hub of a low-mass, low-cost material such as plastic. The rotor is magnetized in the direction 26 or, as best seen in FIG. 2, the rotor is magnetized in a "through manner;" that is to say, magnetized across its thickness direction to provide a north pole on one axial face and a south pole on the opposite face with the adjacent poles being oppositely directed. In the orientation of the permanent magnet rotor seen in FIG. 2, it will be observed that if the field coil 13 is energized so as to instantaneously produce a north magnetic pole at pole 11 and a south magnetic pole at pole 12, the permanent magnet pole immediately between the electromagnetic poles will move to either the right or the left so as to bring the next adjacent pole into position under the pole faces; as the AC supply changes in polarity with the supply frequency the the electromagnetic poles 11 and 12 will reverse so as to produce a south pole at 11 and a north pole at 12 thereby to continue the movement of the rotor and having once started in accordance with conventional theory, the permanent magnet rotor will continue to move in synchronism with the AC field.

Conventional and accepted motor theory provides the following relationship for relating rotor speed to magnetic poles:

No. of poles on the permanent magnet = [alternating current frequency × 2/ desired rotor speed (rps)]

Such a relationship is to be found in the text, Alternating Current Machinery, by L. V. Bewley and published by The Macmillan Company in 1949 page 235.

Contrary to the text, it has been found that the following relationship determines the motor speed of the present invention:

No. of rotor poles = [alternating current frequency (CPS) × 4/rotor speed (rps)]

Thus in the embodiment of FIG. 1 if there are eight north-south pairs of poles uniformly around magnetic annulus 21 and the AC supply frequency is 60 CPS, rotor speed can be determined from the above equation to be 15 rps or 900 rpm. Thus, with the two-pole AC structure, the magnet through-magnetized in the direction of the axis of rotation and in a straight line direction so as to provide alternate north-south poles about its axial periphery, there is provided in the schematic motor of FIG. 1 a functioning device which requires a pole configuration in the permanent magnet motor which is easily formed from oriented magnetic material thereby to utilize the improved characteristics of such magnets without requiring an unduly complex stator structure. In accordance with conventional motor theory, there is relative rotation between the rotor and stator and the permanent magnet can be considered to be the stator if suitable arrangements are made to permit the electromagnetic pole structure to rotate.

As a further schematic example of this invention, the embodiment shown in FIG. 3 is illustrative and comprises an electromagnetic stator generally designated 30 which provides spaced poles 32, 33 and 34, 35 which terminate to provide a gap therebetween with flux being supplied from a suitable field coil 38 connected to an AC source 39. The configuration of rotor 40 is substantially identical to that of rotor 20 wherein it is provided for convenience of description with eight pairs of alternating magnetic poles arranged in a through-magnetized straight line direction with the rotor being generally annular in configuration and supported on a hub 42 which in turn is supported on a shaft 43 journaled in suitable bearing 44. The pole pair 32, 33 has the same instantaneous AC polarity as pole pair 34, 35 and can therefore be considered to be a parallel pole arrangement. Referring to FIG. 4, the spacing D between poles 32, 34 and 33, 35 provides one magnetic pole width separation such that each pole of the electromagnetic pair and cooperates with like permanent magnet poles on the rotor. In operation the function is identical to that just described for FIG. 1, the rotor speed is the same and is determined by the same relationship; the only significant difference between the motor of FIG. 3 and that of FIG. 1 is increased shaft torque output in the motor of FIG. 3 because there are two parallel field projections acting upon the permanent magnet pole configuration.

To more fully illustrate the variety of motor configurations available when utilizing the teachings of the present invention, the motor of FIG. 5 is constructed to utilize the identical rotor of the motor of FIGS. 1 and 3 with a generally annular magnet that is through-magnetized in a straight line direction to provide alternate north and south poles, the rotor 50 being supported on a hub 51 which in turn is supported on a shaft 52 journaled in suitable bearings 53. The stator structure of the motor of FIG. 5 differs from that of the motors of FIGS. 1 and 3 in that, both electromagnetic poles are located on the same side of the magnet; i.e., the stator 60 is provided with two poles 61, 62 a suitable field coil 63 energized from an AC source 64. The poles 61, 62 are positioned in closely adjacent relationship so that pole 62 is positioned directly above permanent magnet pole 62A and pole piece 61 is positioned directly above permanent magnet pole 61A, segment 62A and 61A being adjacent oppositely directed poles on the rotor. Upon energization the rotor 50 will rotate at a speed determined by the aforementioned relationship wherein:

No. of poles on the rotor = [AC current frequency (CPS) × 4/ rotor speed (rps)]

If desired, the flux path between from the south pole of rotor segment 62A to the north pole of rotor segment 61A (see FIG. 6) can be accomplished in a more magnetically efficient manner through utilization of a ferromagnetic flux return disc (shown schematically in dotted lines at 65) positioned on the opposite side of the rotor from the AC poles. This disc can be secured to the rotor itself or, alternatively, can be fixed in position closely adjacent to the rotor.

It is seen from the foregoing description of three alternative and illustrative schematic views of motors constructed in accordance with the invention that a variety of stator configurations can be achieved with a rotor provided with a permanent magnet configuration such that the rotor is through-magnetized in a straight line direction to provide alternate north and south magnetic poles along opposite working faces. The speed of the motor is determined by the number of permanent magnet poles in accordance with the stated relationship.

Turning next to a more commercial form of the invention shown in FIGS. 7 through 10, there is disclosed a motor generally designated 70 having a gear case 71 and an output shaft 72 journaled in bearing 73. The gear case or gear cup 71 cooperates with a front plate 74 to support a plurality of gears of any desired number and configuration 75, 76 and 77 to provide the desired speed relationship between output shaft 72 and rotor shaft 80 to which is secured rotor pinion 81. Rear wall 82 of the gear case 71 supports motor cup 83 and is suitably staked or otherwise fixed to bearing pedestal 85 in which is placed suitable liner of high surface lubricity such as a teflon sleeve 86, the bearing pedestal 85 serving to support shaft 80; plate 82 of the gear case is heavy sheet metal which provides solid bearing pedestal support. The AC field coil 90 is wound on a plastic bobbin 91 which bobbin closely embraces pedestal 85 and has molded in its rear face 92 a spider or flux conductor 93; such a flux conductor adds rigidity to the spool on which the coil is wound and permits use of reduced spool wall thickness thereby permitting more turns of coppper wire to be placd in the same cross-sectional area. Supported adjacent the rear end of shaft 80 is a permanent magnet rotor comprising a generally annular permanent magnet 95 which is secured to a plastic hub 96 which in turn is locked to the shaft 80. Motor cup 83 is secured to rear wall 82 of the gear cup by suitable fasteners such as rivets 98, the rear face of cup 83 being provided with a plurality of apertures 99 which define flux conductors 100, which flux conductors are preferably equal in number to and appropriately aligned with the flux conductors 93 secured in the bobbin of the field coil. The central portion 102 of the cup is apertured at 103 to receive stud 105 of dust cover 106. The dust cover is secured in position with snap-on locks 107 which engage the outer periphery of the cup surrounding three of the apertures 99 with the stud 105 being suitably flattened to function as a rear thrust bearing for shaft 80, the forward thrust bearing being provided by extension 86A of sleeve 86 which engages the hub 96 of the rotor.

Figure 11:
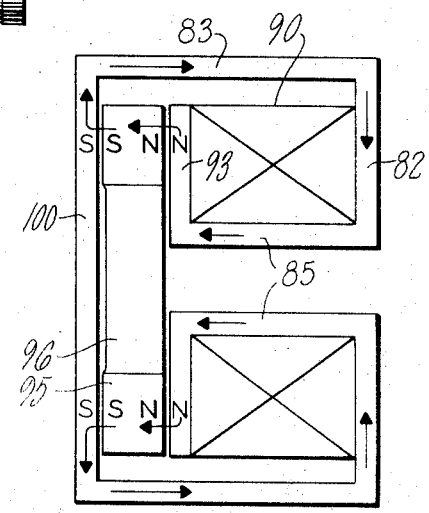
FIG. 11 is a magnetic circuit diagram of the motor of FIG. 7.

The motor of FIG. 7 is similar to that described in the schematic motor of FIG. 3 except that there are nine flux conductor pairs which define a gap and cooperate with nine suitably located permanent magnet areas on the rotor located in the gap, which rotor is magnetized in a direction parallel to the axis of shaft 80 in a through, straight line direction to provide alternate north and south poles around the periphery. For completeness, it is pointed out that the nine permanent magnet areas provide 18 permanent magnet poles suitably located on the rotor of this embodiment. Referring now to FIGS. 10 and 11 wherein there is schematically set forth the magnetic circuit of the motor of FIGS. 7 and 9, it is seen that the field coil 90 at a particular instant provides electromagnetic flux which threads through wall 82 of the gear case, bearing pedestal 85, spider or flux conductor 93 across the air gaps and rotor 95, and motor cup 83 including the flux conductor 100. The distribution of the flux conductors is such that any given instant of magnetization (as for example when the flux conductors 93 are of a north polarity and the flux conductors 100 are of a south polarity with the rotor positioned as shown) like poles will repel and the rotor will rotate. As the next adjacent pair of permanent magnet rotor poles approach the pole pieces 93 and 100 the instantaneous polarity of the electromagnetic pole pieces reverses and continued reaction movement of the rotor is maintained in synchronism with the alternating current field frequency. The speed of the output shaft is determined by the relationship previously mentioned wherein:

No. of poles on rotor =
[alternating current frequency (CPS) × 4/ rotor speed (rps)]

As best seen in FIG. 7, a given outside diameter for the motor case 83 enables the motor of the present invention to provide the maximum number of turns to be placed on the field coil thereby to provide the maximum number of ampere turns and therefore MMF for a given motor configuration. The axial length of the motor is increased only slightly to accommodate the width of the rotor while at the same time permitting the maximum rotor diameter and maximum rotor pole face area to be presented to the pole pieces of the AC field. The same motor configuration permits the use of a ferrous rather than a non-ferrous bearing pedestal for the motor shaft thereby vastly increasing strength, shaft alignment and shaft rigidity while at the same time permitting facile introduction of thrust bearings to insure proper spacing of the rotor in the gap between the pole pieces. The effective reduction of stray fields in the ferro-magnetic parts is accomplished by utilizing flux paths for which structural members do not constitute a magnetic short and leakage paths and gaps can be controlled and dimensioned to suit the motor conditions that are desired.

To further illustrate the many alternative embodiments possible with the present invention, there is seen in FIGS. 12, 13 and 14 an embodiment in commercial form of a motor similar to that shown and previously described in connection with FIGS. 5 and 6. The general construction and configuration of this alternative embodiment is strikingly similar to that shown in FIG. 9 in that the same bearing coil and magnet configuration are utilized to produce a flux conductor member 120 secured to the bearing hub 121 through which the shaft 122 of the rotor 123 is mounted as in the preceding embodiment. The motor cup 119, instead of extending to the out board side of the permanent magnet rotor as in the embodiment of FIG. 7, terminates in a plurality of flux conductors 125 interleaved and substantially co-planar with the flux conductors 120.

Figure 9:
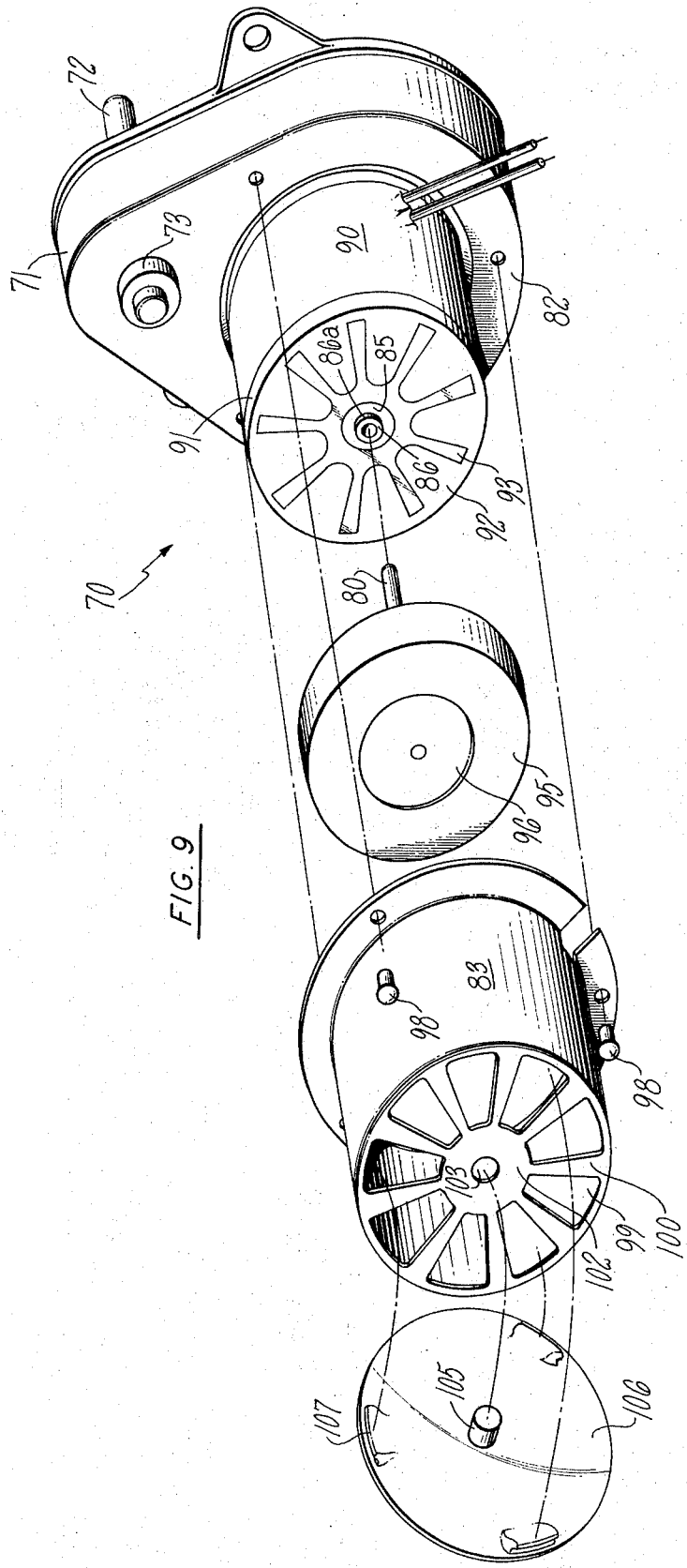
FIG. 9 is an exploded isometric view of the motor of FIG. 7.
Figure 10:
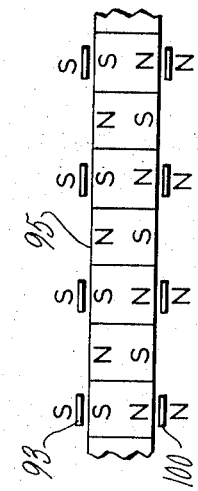
FIG. 10 is a schematic view showing instantaneous polarities of the field structure in cooperation with the rotor structure.

Upon energization of the field coil 126 from an AC source connected to leads 126A there is instantaneously provided adjacent north and south poles arranged in an interleaved co-planar manner which cooperate with the permanent magnet poles on the rotor 123, which rotor is substantially identical to that of the preceding embodiment of FIG. 9. A typical instantaneous magnetic pole distribution is as shown schematically in FIG. 13 with adjacent north and south electromagnetic poles positioned in alignment with the permanent magnet north and south poles such an arrangement being maintained around the periphery of the magnet thereby to produce rotor movement as previously described and at a speed determined in accordance with the stated relationship.

If desired the magnetic efficiency of the motor of FIG. 12 can be increased by providing a magnetic return which for purposes of this embodiment is described as a ferro-magnetic cup 124 secured over and coaxial with the motor cup 119. Such a magnetic return functions in the same way as previously described in connection with FIG. 6 by providing a magnetic flux path between the adjacent north and south poles on the opposite side of the rotor from the electromagnetic poles. As previously described, the speed of the motor in the embodiment of FIG. 12 is determined by the stated relationship.

The motor concepts of the present invention permit great design flexibility so as to provide special purpose motors of atypical configurations. Considering next the motor of FIGS. 14 and 15 wherein the outer support and housing structure has been omitted for purposes of ease of description, there is disclosed a motor of short axial length, a so called "pancake" configuration wherein an annular field coil 140 is disposed within a ferro-magnetic stator structure generally designated 141 that provides two generally parallel sets of axially extending pole projections 142 and 143. Opposite projections, as at 142A and 143A, are appropriately radially aligned in generally opposing relationship such that energization of coil 140 through leads 140A from a suitable alternating current source will produce an instantaneous north magnetic pole at one set of projections and a south magnetic pole at the other set of projections. The rotor 147 includes a permanent magnet 148 supported at one axial edge on disc 149 which, in turn, is secured to shaft 150 journaled in bearing 151 to permit relative rotation between rotor 147 and stator structure 141. The permanent magnet is through-magnetized in a radial direction as shown in FIG. 15 and cooperates with the instantaneous electromagnetic poles formed at pole projections 142, 143 to effect rotation at a speed determined by the stated relationship.

In FIG. 16 there is shown a modified form of the motor of FIG. 14 wherein the permanent magnet 160 is magnetized in the same manner as in the motor of FIG. 14 and is secured to stator member 161 which is provided with electromagnetic pole projectons 162. Member 163, having pole projections 163A is mounted on shaft 164 which, in turn, is supported for rotation in bearing 165. Coil 166 and member 161 are supported on the hub of bearing 165 so that, upon energization of coil 166 from a suitable alternating current source, member 163 will rotate. The instantaneous relationship of pole projections and permanent magnet poles is as shown in FIG. 15 and the rotor speed is determined by the stated relationship.

In the embodiment of FIG. 17 a low-mass rotor is provided by mounting toothed, flux conductor discs 170 and 171 on a ferro-magnetic hub 172 which in turn is secured to shaft 173 that is journaled in bearings 174 for rotation. A non-magnetic housing 175 supports bearings 174 and also serves as the support for permanent magnet 176, which magnet is annular in shape and is through-magnetized in a direction parallel to the axis of rotation of shaft 173 to provide alternate north and south poles along each face as in the magnet of the embodiment shown in FIGS. 9 and 10. An annular coil 177 is supported along the inner circumference of magnet 176 and is energized through leads 177A from a suitable alternating current source, which leads are brought out through suitable passageways in the magnet 176. Upon energization of the coil, instantaneous polarities as in FIG. 18 will cause rotation of the flux conductors 170 and 171, the rotation continuing as the instantaneous electromagnetic polarity changes in synchronism with the alternating current supply frequency; the speed of rotation will be determined by the stated relationship.

In each of the foregoing embodiments the synchronous motor of this invention has been characterized as having two alternating current poles although more electromagnetic poles can be provided if desired. Similarly, whether the permanent magnet is the rotor or whether some other member of the magnetic circuit is the rotor is a choice that can be made provided rotation is always in a direction to cross the direction of the lines of flux in the air gap. Little has been said about the relative width of the AC poles and the permanent magnet poles, such dimensions being suitable for adjustment in accordance with desired motor characteristics such as output torque, starting torque, etc. and are not believed to be a part of the present invention.

From the foregoing description of illustrative embodiments of this invention it is seen that the invention permits a motor design that provides for increased torque output with improved efficiency including the inherent efficiency of utilization of inexpensive orientated permanent magnets.

As will be apparent to persons skilled in the art, various modifications, adaptations and variations of the foregoing specific disclosure can be made without departing from the teachings of the present invention.

I claim:

1. A synchronous motor comprising a stator and rotor assembly, said assembly including winding portion for energization from an alternating current source, a permanent magnet portion and a flux conductor portion for conducting flux from said winding to a location adjacent said permanent magnet portion, said flux conductor portion being positioned on one side of said permanent magnet, said permanent magnet portion being supported for rotation relative to at least part of one of the other portions of said assembly and being through-magnetized in a straight line path to provide discrete north and south magnetic poles in alternate adjacent relationship and wherein the number of poles provided on said permanent magnet is determined by the relationship:

No. of poles =
[alternating current frequency (CPS) × 4/ desired rotor speed (rps)]

a ferromagnetic flux return member being provided on the opposite side of said permanent magnet from said flux conductor portion.

2. A synchronous motor comprising a field structure including first and second poles with flux conducting portions thereof defining pole projections arranged in parallel spaced relationship to define a gap therebetween, the pole projections of one of said poles being formed in the end wall of a cup member forming a part of said field structure, a field coil disposed about at least a portion of said field structure to produce upon energization from an alternating current source, opposite instantaneous polarity between said first pole projections and said second pole projections, said field coil being supported on a bobbin, said second pole being supported on one flange of said bobbin, a permanent magnet member disposed in the gap between said pole projections and mounted on an axle that is journaled in the hub of said bobbin, said cup and bobbin being secured to a mounting plate forming a portion of the field structure thereby to support said rotor in cantilever fashion between the first and second poles, said magnet being polarized in a direction extending across the gap with the adjacent poles of said permanent magnet being oppositely directed, and means supporting said permanent magnet and at least one of said pole projections for relative rotation, the number of poles provided on said permanent magnet being determined by the relationship:

No. of poles =
[alternating current frequency (CPS) × 4/ desired rotor speed (rps)]

3. The synchronous motor of claim 2 wherein a non-magnetic cup-shaped member is secured to the end of the said pole cup thereby to form a dust cover therefor, said member having a centrally disposed section thereon protruding through the cup of said pole structure to engage said axle as a thrust bearing therefor.

4. A synchronous motor comprising a field structure including first and second poles with flux conducting portions thereof defining pole projections arranged in parallel spaced relationship to define a gap therebetween, a field coil disposed about at least a portion of said field structure to produce upon energization from an alternating current source, opposite instantaneous polarity between the first pole projections and the second pole projections, a permanent magnet member disposed in the gap between said pole projections, said magnet being polarized in a direction extending across the gap with the adjacent poles of said permanent magnet being oppositely directed, and means supporting said permanent magnet and at least one of said pole projections for relative rotation, the number of poles provided on said permanent magnet being determined by the relationship:

No. of poles =
[alternating current frequency (CPS) × 4/ desired rotor speed (rps)]
said permanent magnet being of annular configuration having an outside diameter greater than the inside diameter of the field coil thereby to provide a permanent magnet that is large relative to said field coil, said permanent magnet being polarized in a direction parallel to its axis of rotation and disposed adjacent to the field pole structure.

5. The synchronous motor as set forth in claim 4 wherein said annular permanent magnet is supported on a low-mass hub secured to a shaft arranged coaxially with said field coil.

6. A synchronous motor comprising a field structure including first and second poles terminating in co-planar flux conducting portions, the flux conducting portions of the first pole being arranged in alternate relationship with the flux conducting portions of the second pole and with the adjacent flux conducting portions circumferentially spaced, a field coil disposed about at least a portion of said field structure to produce upon energization from an alternating current source, opposite instantaneous polarity between said flux conducting portions of said first pole and said flux conducting portions of said second pole, a permanent magnet rotor supported by said field structure for rotation in a plane adjacent to the plane of said flux conducting portions, said magnet having a plurality of magnetic poles polarized in a direction parallel to the axis of rotation and substantially perpendicular to the plane of the flux conducting portions of said first and second poles with adjacent poles of said permanent magnet being oppositely directed and said permanent magnet being through-magnetized, and a ferromagnetic member positioned at the opposite side of said permanent magnet from said flux conductors to form a low reluctance magnetic return path.

7. The synchronous motor as set forth in claim 6 wherein a central hub forms part of said field structure, the flux conducting portions of the second pole extend generally radially outwardly from said hub, and said flux conducting portions of said first pole extend generally radially inwardly towards said hub from said field structure, said hub supporting said rotor.

8. A synchronous motor comprising a field structure including first and second poles with flux conducting portions thereof arranged in parallel spaced relationship to define a gap therebetween, a field coil disposed about said field structure to produce upon energization from an alternating current source, opposite instantaneous polarity between said first pole projections and said second pole projections, a permanent magnet member disposed in the gap between said pole projections, said magnet being polarized in a direction extending across the gap with the adjacent poles of said permanent magnet being oppositely directed, and means supporting said permanent magnet and at least one of said pole projections for relative rotation, the number of poles provided on said permanent magnet being determined by the relationship:

No. of poles =
[alternating current frequency (CPS) × 4/ desired rotor speed (rps)]
said permanent magnet being annular in form and being secured to said field structure and said first pole projections, said second pole projections being supported on opposite sides of said permanent magnet for rotation relative thereto about an axis co-axial with said permanent magnet.

* * * * *